US007212098B1

(12) United States Patent
Trent et al.

(10) Patent No.: US 7,212,098 B1
(45) Date of Patent: May 1, 2007

(54) PORTABLE SECURITY CONTAINER

(75) Inventors: Douglas E. Trent, Roanoke, VA (US); Richard G. Hyatt, Jr., Shawsville, VA (US); Hermann Sterzinger, Nassereith (AT)

(73) Assignee: Myspace, LLC, Blacksburg, VA (US)

( * ) Notice: Subject to any disclaimer, the term of this patent is extended or adjusted under 35 U.S.C. 154(b) by 1133 days.

(21) Appl. No.: 09/666,804

(22) Filed: Sep. 21, 2000

(51) Int. Cl.
*G05B 19/00* (2006.01)
*G08B 13/14* (2006.01)

(52) U.S. Cl. .................................... 340/5.3; 340/568.1

(58) Field of Classification Search ................. 340/5.3, 340/5.33, 5.5, 5.52, 5.7, 5.73, 5.82, 5.21, 340/568.1, 825.49, 543, 545.6, 546, 649, 340/686.1; 235/19, 381, 375, 385; 455/404.2; 70/409, 63; 109/25, 29, 45, 38, 50, 41, 47, 109/24.1; 700/79

See application file for complete search history.

(56) References Cited

U.S. PATENT DOCUMENTS

| | | | | |
|---|---|---|---|---|
| 4,688,244 A | | 8/1987 | Hannon et al. | |
| 4,727,369 A | | 2/1988 | Rode et al. | |
| 4,750,197 A | | 6/1988 | Denekamp et al. | |
| 4,914,732 A | | 4/1990 | Henderson et al. | |
| 4,926,665 A | | 5/1990 | Stapley et al. | |
| 4,942,831 A | * | 7/1990 | Tel | 109/29 |
| 4,988,987 A | | 1/1991 | Barrett et al. | |
| 5,111,755 A | * | 5/1992 | Rouse | 109/25 |

(Continued)

FOREIGN PATENT DOCUMENTS

WO WO97/22772 6/1997

OTHER PUBLICATIONS

*DECROR® Security Box RS.*

(Continued)

*Primary Examiner*—Wendy R. Garber
*Assistant Examiner*—William Bangachon
(74) *Attorney, Agent, or Firm*—Robert E. Bushnell, Esq.

(57) ABSTRACT

A process and security container that enable local protection and remote transportation of items found with the environment of a contemporary office, while generating a log of users who have gained access to the container. The container may be constructed with one or more sidewalls bearing a removable lid. The container may have a closed interior while the lid is in complete engagement with the sidewalls, and have an open interior able to removably receive items within the interior while the lid is dislodged from its complete engagement. A port is exposed through one of said sidewalls to receive data signals and a control stage with a non-volatile a memory, is mounted within the container and operationally coupled to a host computer to provide communication with the interior of the container via the port. A microprocessor based host computer sited externally to the container, has a keyboard initiating formation of the data signals and a monitor driven by the host computer to visually display video images. The host computer is operationally coupled to the port to participate in the communication by generating the data signals. The controller may generate a control signal and allow access to the interior of the container in response to occurrence of a coincidence between a data key received from the host computer among the data signals via the port and a data sequence obtained by the control stage in dependence upon information stored within the memory.

33 Claims, 14 Drawing Sheets

U.S. PATENT DOCUMENTS

| | | | | | |
|---|---|---|---|---|---|
| 5,131,038 | A | | 7/1992 | Puhl et al. | |
| 5,172,970 | A | | 12/1992 | Momose et al. | |
| 5,218,188 | A | | 6/1993 | Hanson | |
| 5,219,386 | A | | 6/1993 | Kletzmaier et al. | |
| 5,225,825 | A | | 7/1993 | Warren | |
| 5,229,648 | A | | 7/1993 | Sues et al. | |
| 5,245,329 | A | * | 9/1993 | Gokcebay | 340/5.33 |
| 5,278,395 | A | | 1/1994 | Benezet | |
| 5,299,436 | A | | 4/1994 | Spitzer | |
| 5,321,242 | A | | 6/1994 | Heath, Jr. | |
| 5,345,379 | A | | 9/1994 | Brous et al. | |
| 5,385,039 | A | | 1/1995 | Feldpausch et al. | |
| 5,389,919 | A | | 2/1995 | Warren et al. | |
| 5,397,884 | A | | 3/1995 | Saliga | |
| 5,451,757 | A | | 9/1995 | Heath, Jr. | |
| 5,479,341 | A | * | 12/1995 | Pihl et al. | 700/79 |
| 5,541,581 | A | | 7/1996 | Trent | |
| 5,615,625 | A | * | 4/1997 | Cassidy et al. | 109/45 |
| 5,701,828 | A | | 12/1997 | Benore et al. | |
| 5,774,053 | A | * | 6/1998 | Porter | 340/568.1 |
| 5,774,058 | A | | 6/1998 | Henry et al. | |
| 5,825,626 | A | * | 10/1998 | Hulick et al. | 361/724 |
| 5,905,446 | A | | 5/1999 | Benore et al. | |
| 6,057,779 | A | | 5/2000 | Bates | |
| 6,065,408 | A | * | 5/2000 | Tillim et al. | 109/25 |
| 6,072,402 | A | | 6/2000 | Kniffin et al. | |
| 6,082,153 | A | | 7/2000 | Schoell et al. | |
| 6,111,505 | A | * | 8/2000 | Wagener | 340/568.1 |
| 6,161,005 | A | | 12/2000 | Pinzon | |

OTHER PUBLICATIONS

*DECROR® Security Box RI.*

* cited by examiner

PORTABLE SECURITY CONTAINER

CLAIM OF PRIORITY

This application makes reference to, incorporates the same herein, and claims all benefits accruing under from our earlier filing of Disclosure Document No. 456,575 in the United States Patent & Trademark Office on the 19' day of May 1999.

BACKGROUND OF THE INVENTION

1. Field of the Invention

The present invention relates to processes and containers for controlling access to valuable items and, more particularly, to processes and systems for managing the security, access, use, siting and transportation of containers.

2. Background Art

In general, the need for protection and storage of valuables, sensitive information and controlled substances has increased over the past decade, particularly with the introduction of new forms of valuable tangible property such as the higher density optical and magnetic storage media. Contemporary offices rely upon one or more security devices such as mechanical locks placed upon cabinets, safes, doors and buildings to provide physical security for the interior of the office as well as the contents distributed throughout the office during normal working hours. We have noticed however, that these approaches to office security do not provide any audit information about either the use of the security devices or about the personnel who use the devices. The need to control access as well as to provide an accurate record of personnel having access and the time of their access requires both physical and electronic security measures. In an office environment for example, items such as confidential papers, diskettes, engineering documents, and intrinsically valuable materials (such as, by way of example, gold electrical contacts) other tangible items are most conveniently left exposed upon a counter, in an insecure state, during normal working hours. Although these items may be stored in cabinets or desk drawers after hours, the degree of the security provided is poor. Office fixtures are typically only secure temporarily and, in most cases, unauthorized access cannot be detected. Efforts such as the Electronic Interlock For Storage Assemblies of E. O. Warren, U.S. Pat. No. 5,225,825, and the Locker Unit Comprising A Plurality Of Lockers of K. Kletzmaier, et al., U.S. Pat. No. 5,219,386 are exemplars of recent efforts in the art to electronically control access, albeit primarily access to stationary objects such as doors and safes, and to provide both physical security and audit information about the use of the security devices. Although some electronic access control systems do endeavor to provide access control and audit capabilities, others such as the Portable Authentification System of L. C. Puhl, et al., U.S. Pat. No. 5,131,038; the Electronic Lock And Key System of F. Rode, et al., U.S. Pat. No. 4,727,369, the Fast Access Electronic Locking System of J. C. Spitzer, U.S. Pat. No. 5,299,436; and the Portable Electronic Access Controlled System For Parking Meters Or The Like of Paul Benezet, U.S. Pat. No. 5,278,395 do not consistently, inexpensively and reliably address the need for transportation of assets between remote locations in a secure manner. We have found that the unauthorized and undetected access to sensitive information or materials during transit, or during storage, is a concern that has not previously been adequately addressed by the art.

SUMMARY OF THE INVENTION

It is therefore an object of the present invention to provide an improved security process and container.

It is another object to provide a simplified security process and portable container that conforms to contemporary business office practice by securing valuable items for both storage and transportation to remote locations.

It is yet another object to provide a security process and portable container that is readily and repeatedly usable to quickly receive, store and transport valuable items, while providing a log of the users who gain access to the container.

It is still another object to provide a process and portable container to enhance the security of contemporary offices.

It is still yet another object to provide a process and security container that readily conforms to habits and customs common to a contemporary business office while enabling local protection and remote transportation of items found within the environment of the contemporary office.

It is a further object to provide a process and security container that readily conforms to habits and customs common to a broad spectrum of contemporary business offices while generating a log of users who have gained access to the container.

It is also an object to provide processes and systems for easily and reliably managing the security, access, use, siting and transportation of containers.

These and other objects may be attained with a process that uses a data key to control access to a portable container. The container may be constructed with a housing having one or more walls supporting either a removable lid, or other panel providing access to the interior of the container. The container has a closed interior while that panel is in complete engagement with one or more walls of the housing, and an open interior able to removably receive items while the panel is dislodged from its complete engagement with the housing. A port is exposed through one of the walls of the container to receive data signals, and a control stage incorporating a non-volatile memory is operationally coupled to provide communication with the interior of the container via the port. The controller generates a control signal in response to the occurrence of a coincidence between a data key received via the port and a data sequence obtained by the control stage in dependence upon information stored within the memory. An electromechanical latch is positioned to engage the lid and hinder removal of the lid from its complete engagement, and to respond to the control signal by releasing the lid from its complete engagement to allow access to the interior of the container. A host computer sited externally to the container, communicates with the controller via the port, and drives the container as a peripheral device. In response to a request for access entered via a keyboard coupled to the host computer and transmitted by one, or more, of the ports provided by the container, the controller makes a determination of whether to grant the access requested by generating a control signal that allows the lock to release the access panel on the basis of, inter alia, the disposition of the port relative to a source of the data signals, on the basis of the disposition of the container within a scheme for generation of the data signals, and in response to occurrence of a coincidence between a data key received by controller among the data signals via the port and a data sequence obtained by the controller in dependence upon the information stored within the memory.

These and other objects may also be attained with the control stage being operationally coupled to provide communication with the interior of the container via the port, and generate an alarm signal in response to an unauthorized interruption of the communication via the port. An alarm is driven by the controller to broadcast an indication of the unauthorized interruption in response to the alarm signal. The alarm may be located either within the container or driven directly by a host computer that is external to the container and that absent the interruption, communicates with the controller via the port.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
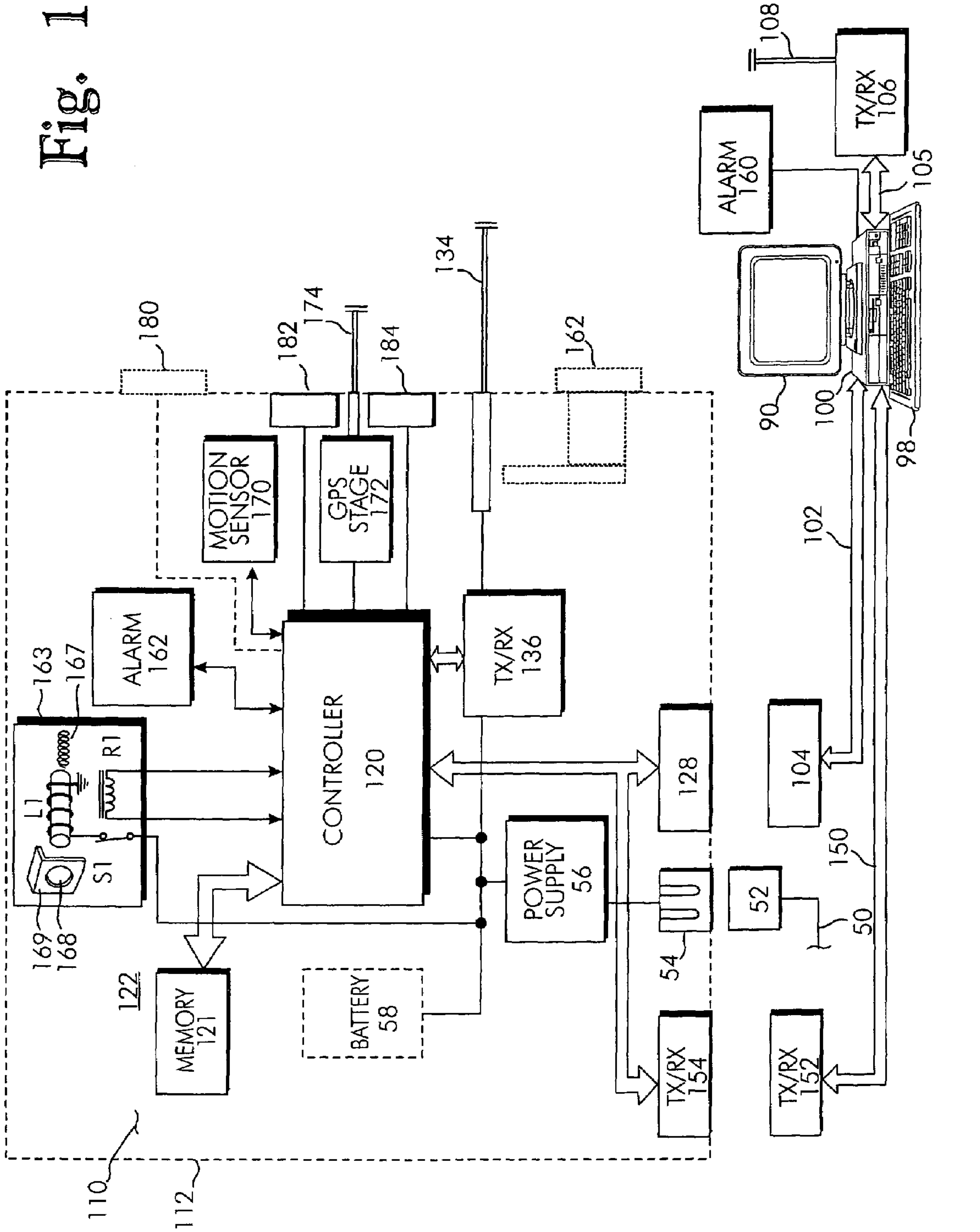
FIG. 1 is a block diagram of one embodiment of a container management system that may be constructed in accordance with the principles of the present invention.
Figure 2:
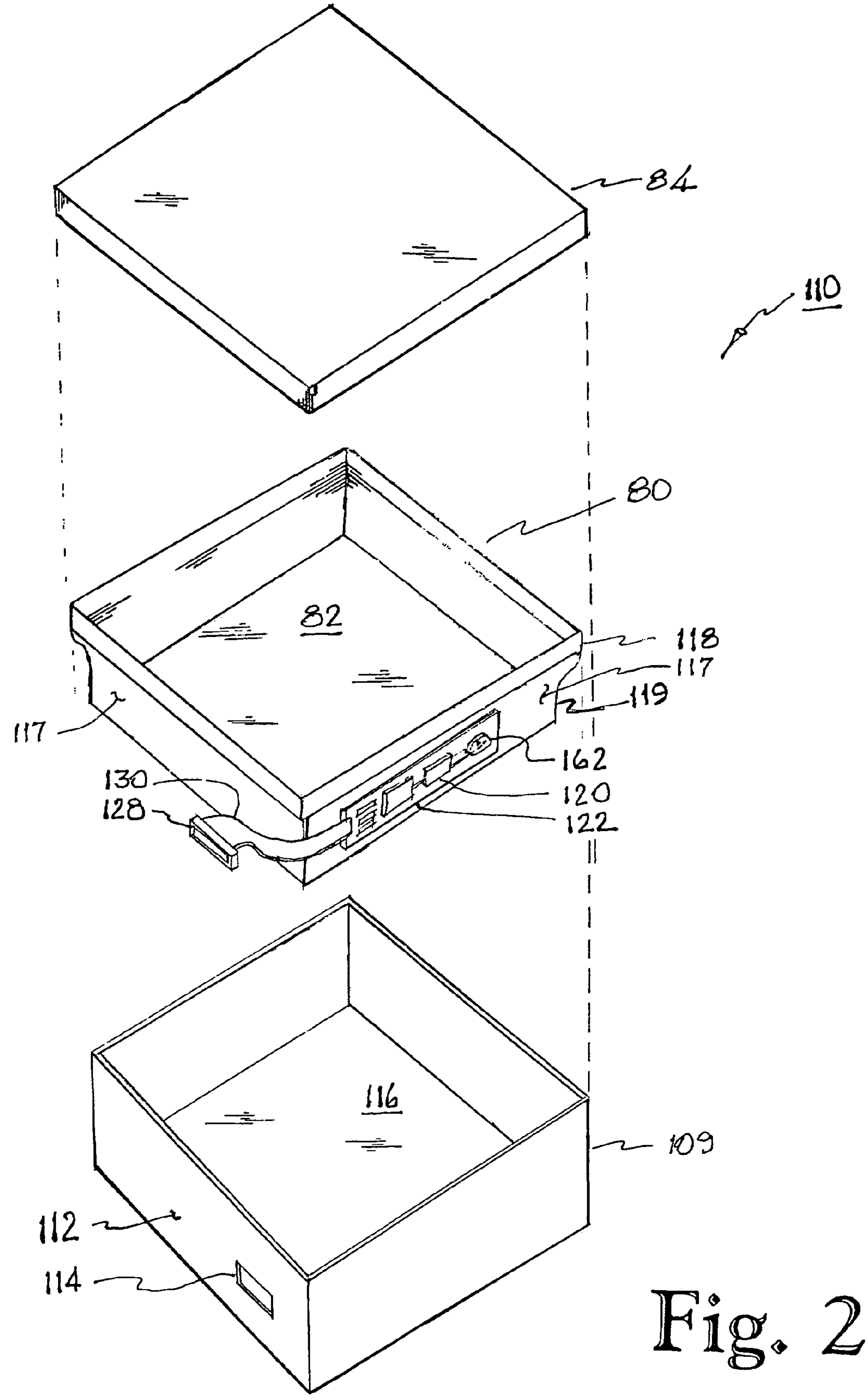
FIG. 2 is a perspective view of a portable container that may be constructed in accordance with the principles of the present invention.

Turning now to the drawings, FIGS. 1 and 2 illustrate one embodiment of a container management system that may be constructed in accordance with the principles of the present invention, with a host computer 100 driving a video monitor 90 to display varying visual images and symbols, and a keyboard 98 that enables a user to manually enter information and commands into computer 100. A data cable 102 such as a serial cable, a parallel multi-lead cable, a small computer system interface (i.e., a SCSI) cable, a universal serial bus (i.e., a USB) cable, or one or more optical fibers, is coupled at one end into a conforming socket operationally connected to the motherboard of computer 100, and terminated at the opposite end by a plug 104 that may be removably inserted into a socket 128 that is operationally coupled, by for example, a ribbon cable 130 that provides a data bus, to a microprocessor based controller 120. Information received by controller from host computer 100 may be written into and read from a non-volatile memory 121 that is addressed by controller 120.

A motion sensor 170 may be mounted either upon circuit board 122, or within container 110, to provide motion signals to controller 120 whenever sensor 170 detects movement of container 110. Senor 170 may be implemented with a spring loaded switch designed to provide motion signals that exhibit one logic state when container 110 is stationary upon a desktop, for example, with the juxtaposition of the container and the desktop holding the actuator of the switch depressed, and a second and different logic state when container 110 is lifted above the desktop and the actuator of the switch is released. Alternatively, motion sensor 170 may detect changes in inertia and provide a motion signal to controller 120 whenever container 110 is in motion.

A location sensor such as, by way of example, a global position satellite receiver stage 172 and its antenna 174 mounted to extend externally to container 110, may be periodically polled by controller 120 to furnish a relatively accurate indication of the geographic location of container 110. Controller 120 may be programmed to refuse to deny access to container 110, by way of example, refusing to release an electro-mechanical latch whenever receiver stage 172 fails to indicate that container 110 is located at an assigned location.

As illustrated in FIG. 2, the portable container 110 may be constructed with one or more sidewalls 112 forming an outer casement 109 closed at one end by a continuous bottom surface 116. An inner casement 118 for container 80 may be constructed with one or more sidewalls 84 jointed together and closed at one end by a continuous bottom surface 82. The upper rim 86 of container 110 may be extended outward to engage the inner surfaces 88 and sidewalls 112, thereby providing a cavity 19 between the spaced apart sidewalls 84 and inner surfaces 88 that may be used to accommodate a circuit board 122, lead cable 130 and socket 128. An aperture 114 formed on one of the sidewalls 112 exposes socket 128 to an environment external to a container 110. A lid, or other panel 84 encloses both the inner and outer containers, once inner container 118 has been inserted between sidewalls 112 of outer container 70, and controls access to the interior of inner casement 80 and thus container 110. When panel 84 completely engages the sidewalls 112 of outer casement 109, access to the interior of container 110 may be utterly denied; when panel 84 is dislodged from this complete engagement however, full access may be permitted into the interior.

An electro-mechanical latch 163 operated by controller 120 may be mounted within container 110 to restrict removal of access panel 84, and thereby preserve the unrestricted access to the contents of container 110 while panel 84 remains undisturbed in its complete engagement of lower container 70. Controller 120 regulates application of an electrical current to relay R1 to control whether the contact wiper of the switch S1 component of relay R1 is opened or closed, and whether electrical current is applied to solenoid L1. In the absence of electrical current through solenoid L1, that is, when switch S1 is in its electrically open state, a spring 167 may be used to bias the armature 168 to extend axially outward along the central axis defined by the coil winding of solenoid L1, and engage the aperture 168 formed in a hasp 169 mounted on the underside of panel 84. When controller 120 directs relay R1 to close switch S1 and apply an electrical current to the winding of solenoid L1, the armature of solenoid L1 is withdrawn from aperture 168, as is shown in FIG. 1, to release hasp 169 and allow removal of panel 84. Optionally, in mechanical lock 162 such as a cylinder lock rotatably operated with a bitted key, may be mounted on the outer casement 70 at a location enabling lock 162 to engage lid 84 and thereby provide an additional degree of security when lock 162 is turned into its locked position. It should be noted that although circuit board 122 is mounted upon one of the several sidewalls 84 of the inner casement 80, it is also feasible to mount circuit board 122 beneath floor 82, and between outer floor 116 and inner floor 82, or, alternatively, to distribute the components mounted upon circuit board 122 into various distinct and different locations within the container, and even upon a underside of access panel 84.

Nominally, circuit board 122 may be powered directly by a power cord 50 with a jack 52 received within a socket 54 mounted upon circuit board 122. A power supply 56 coupled to socket 54, may be used to rectify, filter, attenuate and distribute electrical power to rechargeable battery 58 mounted upon circuit board 122, as well as to electro-mechanical latch 163, controller 120 and transceiver 136, alarm 162, motion sensor 170 and location sensor 172, among other elements supported by circuit board 122.

Turning now to FIGS. 3 through 8, communication between host computer 100 and controller 120, or alternatively, a local computer 100 or a computer 101 sited at a remote location to which container 110 has been transported, may be conducted in various modalities, depending upon which aperture within container 110 is serving as a port (e.g., an industry standard personal computer socket 128 (e.g., a serial port socket, a parallel port socket, a SCSI I or SCSI II socket, or a universal serial bus socket), infrared transmitter and receiver unit 154, radio or microwave length antenna 134, or global positioning satellite antenna 174) to accommodate transmission of data signals between a host external to container 110, such as computer 100, 101, and the controller 120 encased within container 110. A multi-lead data cable 102 terminated by plug 104 may couple either a parallel port, a serial port, a small computer system interface port, or universal serial bus port of computer 100 to bus 130 and controller 120 via socket 128. Alternatively, a data cable 150 coupled to an infrared transmitter 152 may communicate via line-of-site to infrared transmitter 154 that may be mounted in aperture 114, or within a different aperture, to receive communications from infrared transmitter 152. Preferably, an infrared transmitter and infrared receiver unit 152 would be used to communicate with an infrared transmitter and infrared receiver unit 154 coupled to controller 120 via data bus 150. Alternatively, computer 100 may drive radio frequency or microwave transmitter and receiver unit 106 via data cable 105, to propagate radio frequency or microwave signals via antenna 108. Portable container 110 may be fitted with retractable antenna 134 to receive the radio frequency wave signals propagated from antenna 108, or alternatively, a microwave antenna to receive microwave signals. Antenna 134 may be coupled to controller 120 via transmitter and receiver unit 136. Consequently, and regardless of whether data cable 102 is simply a direct electrical or optical connection with an output port of computer 100, 101, or a category 5 local area network, the conduction of transmission of data signals via port 28 is dependent upon the disposition of container 110 relative to the source (e.g., personal computer 110, 101) of the data signals. By way of example, if container 110 is moved away from the neighborhood of data cable 102, the limited length of data cable 102 will ultimately cause jack 104 to unplug from socket 128, thereby interrupting the conduction of transmission of data signals via port 128. Assuming that infrared transmitter and receiver unit 154 is serving as the port however, movement of container 110 relative to host computer 100, 101 to a location that would remove the line-of-sight alignment between infrared units 152, 154 will cause an interruption in the conduction of transmission of data signals via port 154. Should antenna 134 serve as the port for communications between computer 100, 101 however, movement of container 110 relative to computer 100, 101 to a location where either intervening electrical conductors, attenuation of signal strength due to distance, or removal of antenna 134 from the field of antenna 108 will cause an interruption in the conduction of transmission of data signals via port 134. With this modular configuration, the data signals exhibit a first wavelength, and the communications from the host computer may exhibit a second and different wavelength carrier signal. Port 128 is plug coupleable to controller 120, and may incorporate a receiver stage converting the communications into input signals that exhibit the first wavelength, and a transmitter stage converting the data signals into output signals that exhibit the second wavelength within the radio frequency, microwave or various optical frequency bands. Alternatively, first and second units may be plug coupleable to controller 120 and interchangeable with one another to provide a data connection between the controller and the host computer with one unit used when the data signals received by the port exhibit the same wavelength as the data signals provided by the controller, and the other unit used when the communication has a carrier frequency component.

The interruption of the conduction of transmission of data signals via the selected port, or ports, provided by container 110 may be used, together with one or more schemes for transmission of data signals (including transmission of a data key to authorize access to the interior of container 110), as well as the content of the data signals transmitted, to restrict and control access to the interior of container 110. If, for example, antenna 174 is serving as the port accommodating conduction of transmission of data signals, movement of container 110 to a geographic location outside of the authorized range of siting (e.g., assuming that the global positioning system has a range of ±30 feet, movement of container 110 to a location more than thirty feet from the location authorized by computer 100 will be readily discernable by controller 120 from the position signal 8 provided by GPS stage 172) is a factor that may be used by controller 120, in conjunction with host computer 100, in a scheme to control access to the interior of container 110. Accordingly, in response to a request for access entered via keyboard 96 and transmitted by one, or more, of the ports 128, 134, 154, and 174 provided by container 110, controller makes a determination of whether to grant the access requested by generating a control signal that allows lock 162 to release the access panel 84 on the basis of, inter alia, the disposition of the port relative to a source of the data signals, on the basis of the disposition of the container within a scheme for generation of the data signals, and in response to occurrence of a coincidence between a data key received by controller 120 among the data signals via the port and a data sequence obtained by controller 120 in dependence upon the information stored within memory 121.

Interruption of communications between computer 100 and controller 120 mounted on, or within, container 110, regardless of whether the interruption of communication occurs by removal of plug 104 from socket 124, severance of data cable 102, movement of container 110 to prevent transmission of signals between infrared units 152, 154, or interference with or suppression of signals between antennas 108, 134, may be used to trigger either alarm unit 160 driven directly by computer 100, or alarm 162 mounted on, or within container 110 and driven directly by controller 120, or alternatively, by both alarm units 160, 162, to broadcast a sensible alarm indicating the interruption of communication.

Figure 7:
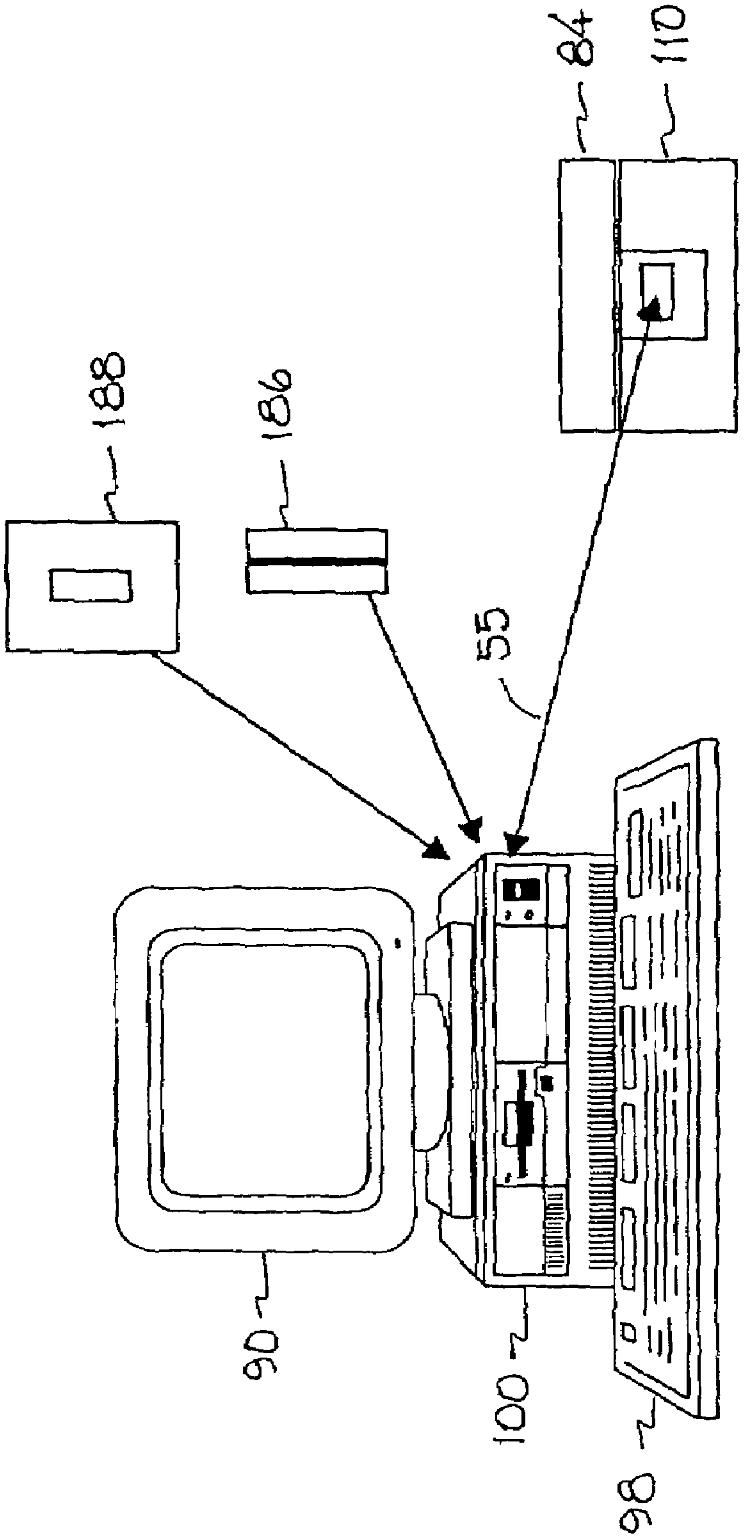
FIG. 7 illustrates an alternative implementation of the principles of the present invention with a host computer directly driving peripheral components that include a biometric scanner, a card reader and a portable container.

Although FIG. 1 shows container 110 fitted with separate data socket 128 and power socket 54, these sockets may be combined into a single socket 128 receiving both electrical power and either optical or electrical signals from plug 104. Additionally, container 10 may be fitted with a keypad or other manually operable switches 180 to enable container 110 to communicate with controller 120 independently of keyboard 98 and computer 100. This may be useful, for example, to power-up controller 120 or alternatively, to initiate a transmission from controller 120 to computer 100. Additionally, container 110 may be fitted with a visual or aural status indicator 182 such as a light-emitting diode that either flashes, is intermittently illuminated or is illuminated with different colors to indicate the status such as "no fault" or, no unauthorized movement or to indicate an unauthorized attempt to gain access to the contents of container 110. A touch memory port 184 may also be fitted into container 110 to enhance security, by way of example, to enable controller 120 to obtain a thumb print or a finger print from a prospective user and compare the print obtained via touch memory port 184 with a print of the prospective user that is stored in memory 124. Additionally, and as illustrated in FIG. 7, either or both host computer 100, or the computer 101 sited at the designation of container 110 may be operationally coupled to maintain communications with portable container 110 via line-of-sight infrared transmissions 55. A biometric scanner 188 may be connected to computer 100 as a peripheral unit to provide an enhanced degree of security, particularly when used together with a magnetic or optical strip card reader 186. Together, biometric scanner 188, card reader 186 and keyboard 98 allow the input of the three items of security information from each prospective user of container 110 essential to a rigid security scheme, namely who the prospective user is (e.g., via biometric scanner 188), what the prospective user has possession of (e.g., namely an access card bearing a magnetic or optical strip confirming the authorization of the bearer to obtain access to the interior of container 110), and what the prospective user knows (e.g., a data key known to the prospective user that may be entered via keyboard 98). Authentication of these items of information by computer 100, 101, enables the computer to communicate with controller 120 borne by container 110 and authorize controller 120 to allow the user to gain access to the interior of container 110, as, for example, by energizing solenoid L1 to release access panel 84.

Figure 8:
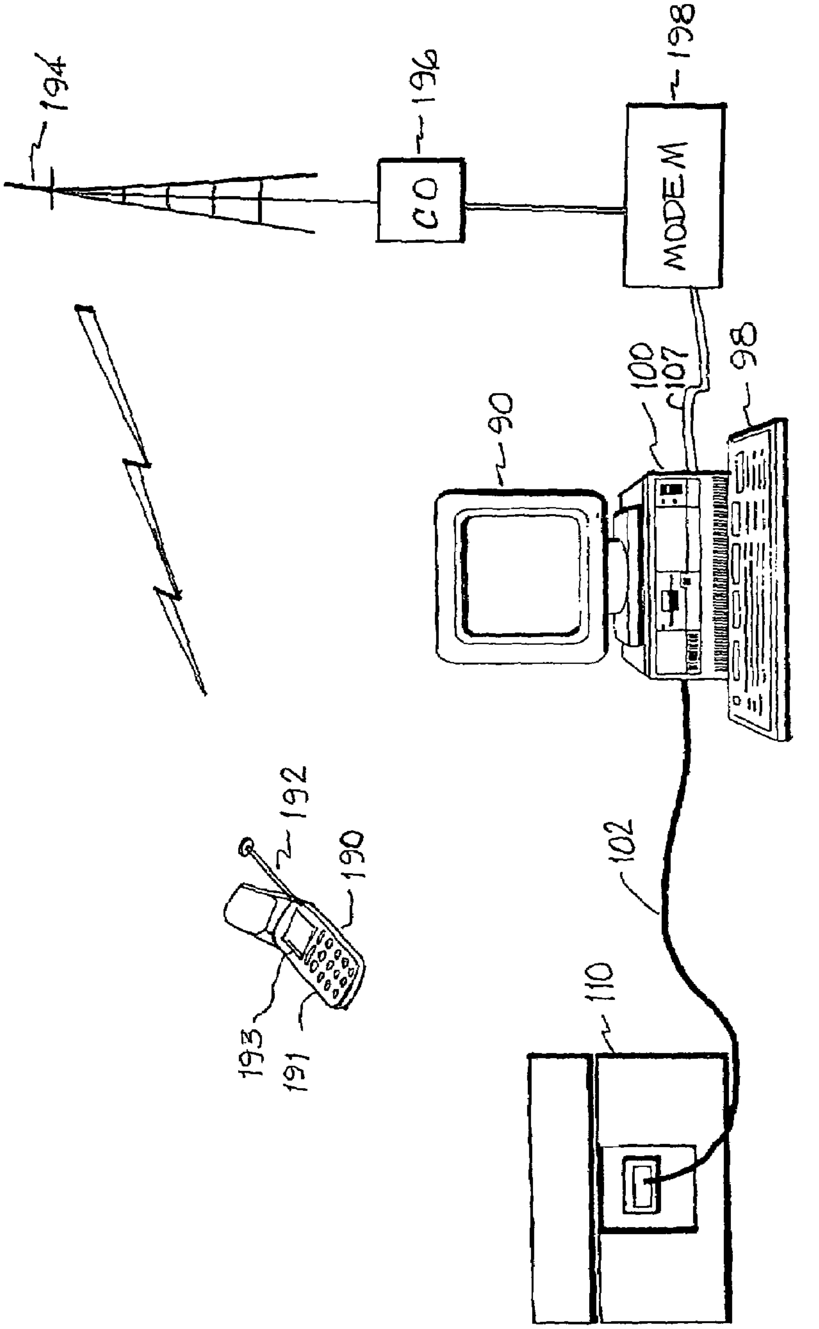
FIG. 8 illustrates an alternative implementation with a cellular telephone controlling access to a portable container.

FIG. 8 illustrates an alternative implementation with a telephone, such as a handheld portable cellular telephone handset 190 that is in communication via its antenna 192 with a central office (CO) 196 via a cellular tower antenna 194. Host computer 100 may either have an internal modem or be operationally coupled with lead 104 to an external modem 198, that is in turn coupled as a subscriber of the central office 196. This configuration enables the user of telephone 190 to control access to container 110 via host computer 100, even though the user and telephone 190 are located several miles away from the site of container 110 and host computer 100. The multifunction keypad 191 of cellular telephone 190 serves the user as a substitute for keyboard 98, while the liquid crystal display screen 193 serves the user as a substitute for monitor 90, and permits the user to indirectly, and remotely enter information into controller 120 and to receive information from controller 120.

The system may be implemented with one or more portable containers 110, each having space for storage of valuables. Each portable container 110 has a locking mechanism 160 that is used to control access to the contents of the container. The locking mechanism 160 electro-mechanical in design and controlled by electronic circuitry mounted on circuit board 122 that is located inside the portable container. The portable container electronic circuitry will respond to a communications link with an outside control point through the use of a communications port on the container. Access to the contents of the container is controlled through a verification scheme communicated between a control point device, which may be a personal computer 100, 101, and the portable container 110.

Power for operation of the portable container electronic circuitry and electro-mechanical lock 160 will be normally supplied at the control point; however in one application, the power supply may be an auxiliary unit 58 that is contained within the container. Portable container 110 may be used in a stationary mode where the container is connected to a personal computer 100 for the purpose of communicating between the electronic logic circuits on circuit board 122 in the container locking mechanism and the software application used to control access to the container. The container 110 may be left in the open and unlocked condition while being used frequently and closed and locked when access is not required. The personal computer 100, 101 will have the ability through the hardware and software to detect the presence of the portable container and to determine its current state, that is, whether container 110 is open or whether container 110 is closed and operational its location as well as its contents are secure.

In order for access to be made into a closed and locked container, the user will be required to input certain personalized information into the personal computer 100, 101. The personal computer 100, 101 will verify this information and send the data signals including a data key necessary for the logic circuits of controller 120 mounted within container 110 to determine that a valid request to unlock had been received from an authorized individual. Controller 120 would then allow for the access requested by operating locking mechanism 163. One access per request from the personal computer may, in one embodiment, be allowed.

Circuit board 122 inside the portable container 110 will store audit trail information into its internal memory 121 for each access request. This audit information is available to be extracted from memory 121 of the portable container 110 for future interrogation. The personal computer 100, 101 or other control point will also store audit information for each access request and associated activity in its ongoing historical database.

Figure 3:
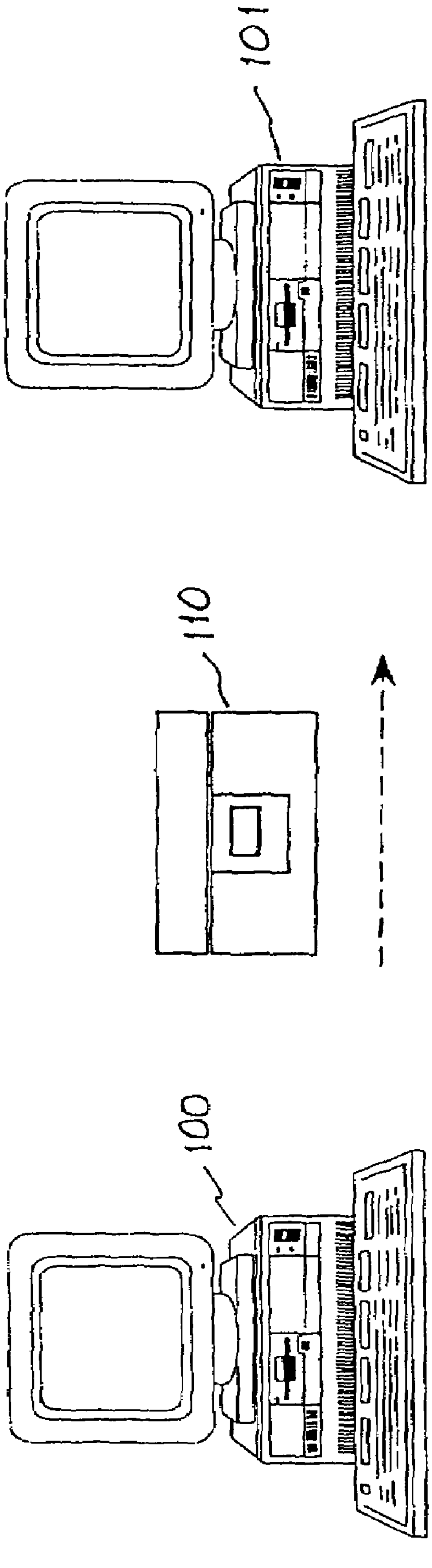
FIG. 3 illustrates the transport of a portable container between a host computer sited at an origin and a host computer sited at a destination.
Figure 4:
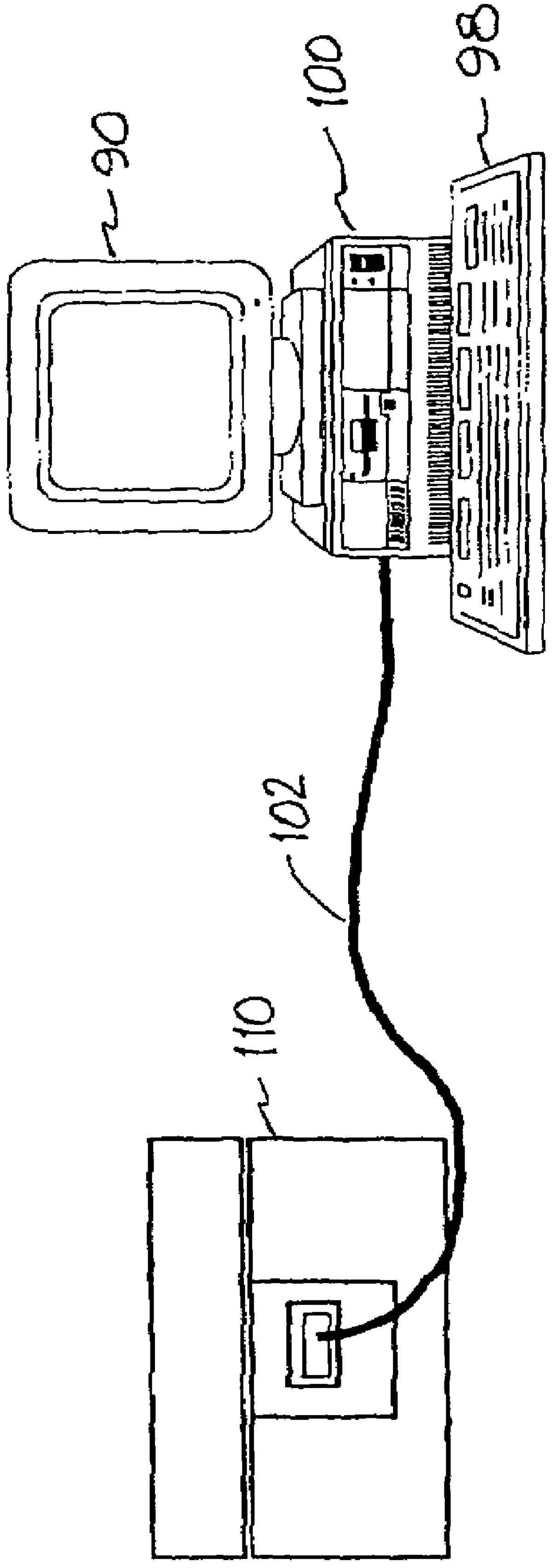
FIG. 4 illustrates a typical implementation of a host computer connected to a container during the practice of the principles of the present invention.
Figure 5:
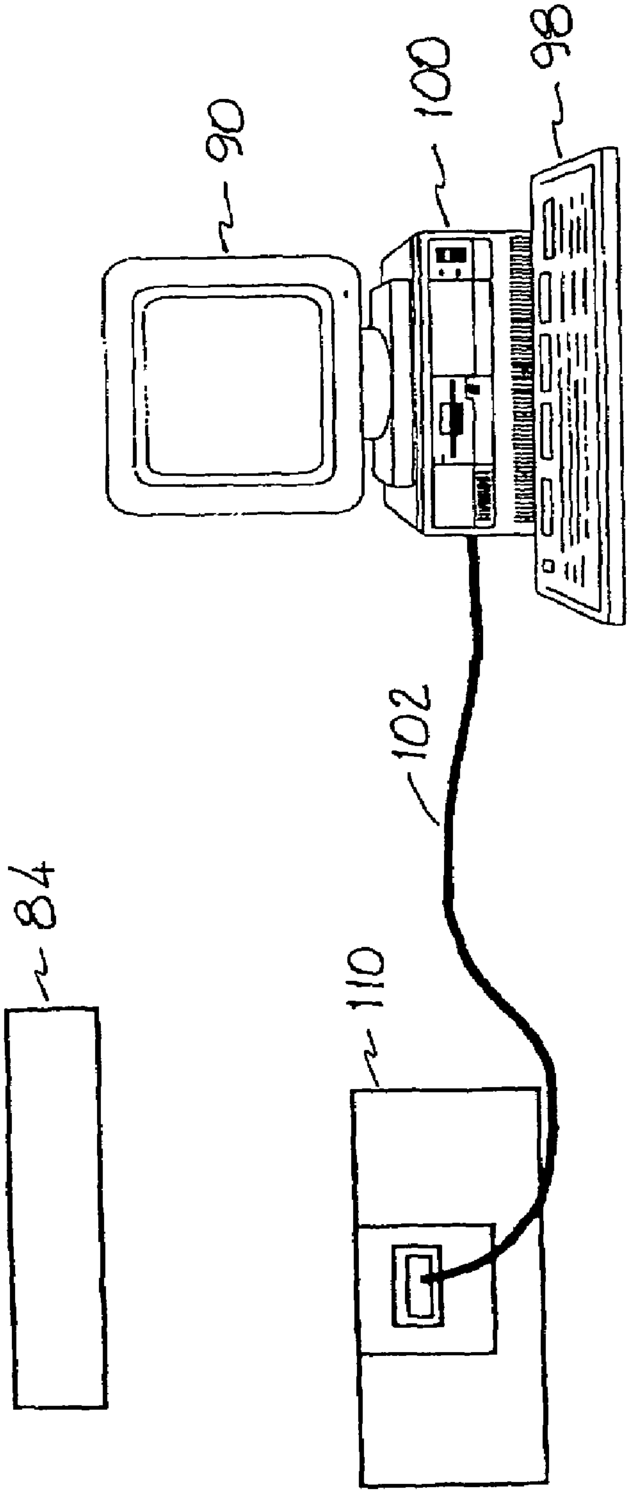
FIG. 5 illustrates the implementation of FIG. 4, with the access panel removed to provide access to the interior of the container.
Figure 6:
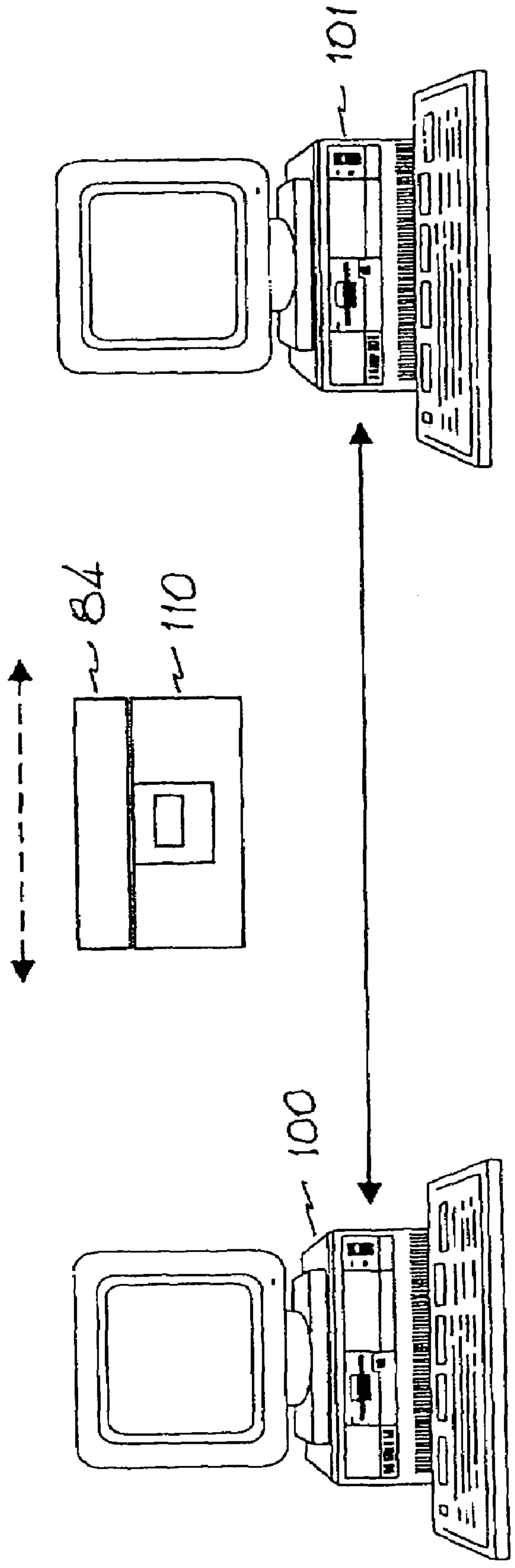
FIG. 6 illustrates the transport of a portable container between a host computer sited at an origin connected by a network to a host computer sited at a destination of the portable container.

As indicated by FIGS. 3 and 6, in the event it becomes necessary for container 110 to be transported to a different location, the container can be locked securely and transported. The contents of the portable container will be kept secure during the transportation of the container. Upon arrival at the desired destination, the container could then communicate with a secondary control point such as a local personal computer 101 that has, or is given (by the originating personal computer or by the user) the necessary data required to communicate with the container for the purpose of gaining access to the interior of container 110.

The data key used to determine the validity of an access request may take the form of a digital password that is written to the container control logic of circuit board 122, or may be information that is unique to, or known by the user transporting the container. The portable container authorization data may be transferred from the originating control point to the destination control point utilizing a network communications approach such as the Internet or by way of wireless communications.

It is also a feature of the portable container system to utilize biometric data in the authorization process. Biometric data can associate the individual users requesting access to data that was communicated to the locking mechanism control circuitry at the point of origination when the container was secured for transport.

Each portable container 110 may also be used in a roaming mode where authorization data is presented to the container control logic circuitry of controller 120 directly from the user. This information may be input through an optional multikey keypad 180 that is a component of the container or through a communications device such as a portable touch memory credential such as the multi-function key pad 191 of cell phone 190. This feature will allow the authorized user to have free access in locations remote from the origination control point.

Access to the portable containers in the system may be geographic (as represented by global positioning satellite signals), time and date dependent in addition to the user or control point verifications. Features such as dual control (requiring more than one user to be verified) and time delay (a wait period after verification before locking mechanism 163 in container 110 allows access) are available. Additional features, such as mechanical locks 162 may be combined with the electronic access control in container 110 to further enhance the overall security of the container system.

This advantageously enables one of the user's host computers 100 to communicate via data cable 102 directly with the controller 120 within portable container 110, or alternatively, to communicate via a network such as a local area network coupled to the port provided by socket 128. As a further alternative, host computer 100 may communicate via data cable 104 with a radio frequency transmitter and receiver 106 that, in turn, can communicate via antenna 108 and a retractable antenna 134 mounted in one of the sidewalls 112 of container 110, with a transmitter and receiver 136 connected to provide signals to controller 120. As an additional alternative, host computer 100 may communicate via data cable 150 with an infrared transmitter and receiver 152 that, in turn, can communicate via an infrared receiver and transmitter 154 mounted in one of the sidewalls 112, to controller 120.

The foregoing paragraphs describe details of a container management system that advantageously provides a portable lock with an authentication component that may be time, date, geographic and person dependent, and that is in most configurations, stationary. Biometric data of authorized users may be stored and carried by the lock. Access to the container may be attained through use of personal keyboard in which the authentication may be based upon input from the computer keyboard, or any of several profile devices such as a retina that is a part of eyeball scan or a thumb print read by a scanner connected as a profile devices to the computer. This system provides a technique for sending authentication or authorization data to the remote destination of the portable container via either Internet or some other network communication, or for acquiring the authentication or authorization locally in dependence upon one or more of various possible combinations of geographic data such as signals received directly by controller 120 from global positioning satellite signals, personal data such as retina or thumb print of the individual seeking access, and authorization data transmitted directly to or previously stored in a remote computer terminal 101.

Figure 9:
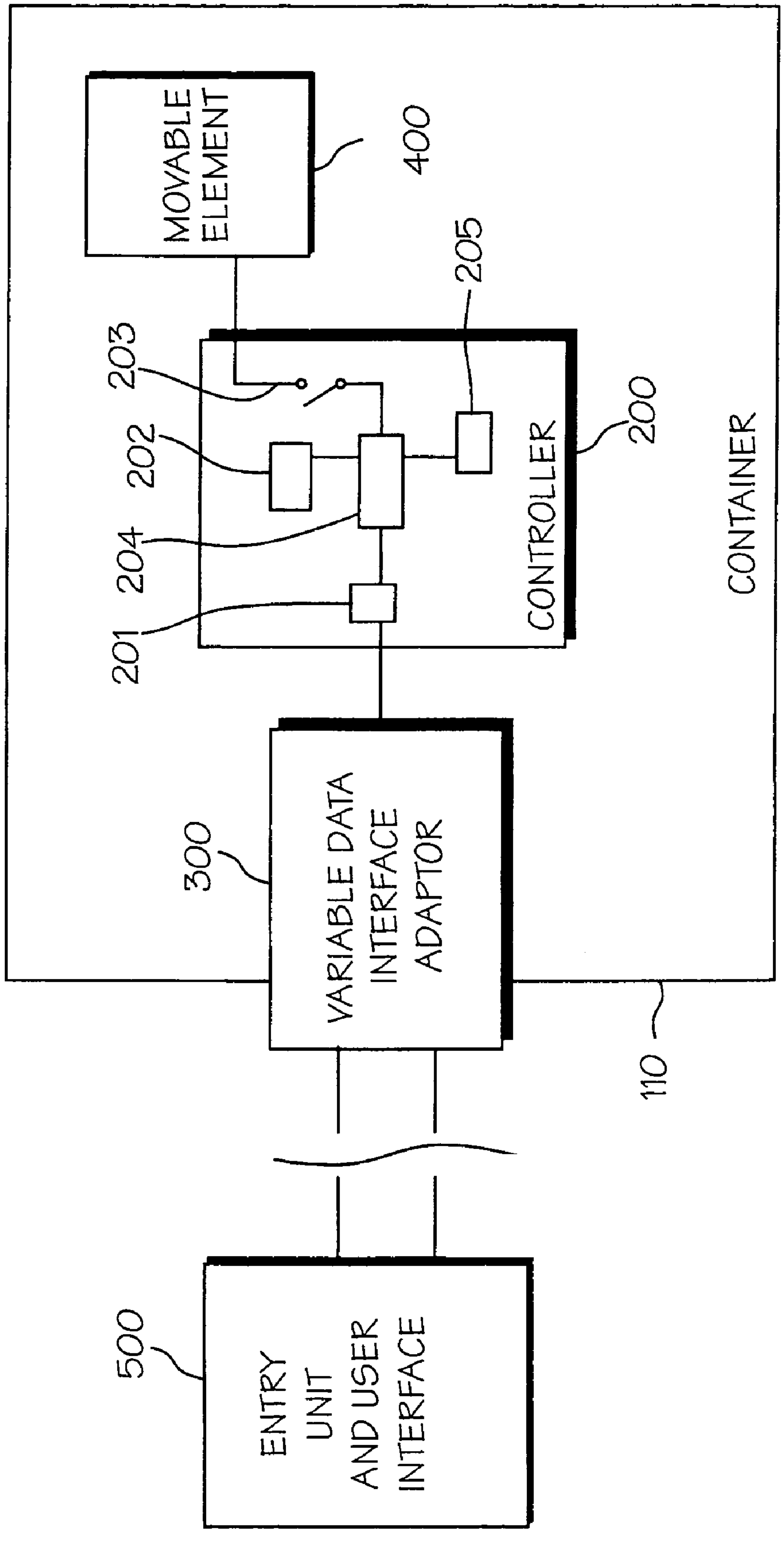
FIG. 9 is a schematic block diagram illustrating an alternative embodiment of the present invention.

Turning now to FIG. 9, a portable box 110 is able to store valuables for removal or access by either the same by a different user. Access to the contents of box 110 is effected by change of state of movable element 400 as a result of an action by the decision control point 200. Control point 200 is extended by variable data interface adaptor 300 so that control point 200 may receive data from, or send data to a variety of entry units 500. A changeable variable data interface adapter 300 may be removed and replaced without affecting the code stored in memory 202 of controller 200. Both the hardware and software configurations of changeable variable data interface adaptor 300 may allow different forms of entry units 500 to be used. Accordingly, entry of subsequent data may be transmitted through different forms of entry units 500, because adaptor 300 is both removable and interchangeable with other adaptors 300. Controller 200 includes an input/output stage 201, an operational memory 202, output stage 203, driving movable element 400, microprocessor 204 and clock 205.

Storage container 110 allows storage of valuable contents and may allow, or deny access to the contents. Container 110 is portable, contains and safely transports controller 200, houses and also transports moving element 400, and contains, or partially contains, variable data interface adapter 300. Controller 200 stores code data in memory 202 for comparison to data received by container 110 via adaptor 300, while storing information for transmission via adaptor 300, to describe the event history and provide and audit trail about the use and movement of container 110. In essence, controller 200 regulates access to the contents of box 110 by controlling moving element 400, and allows access on the basis of data delivered via adaptor 300. Optionally, controller 200 may make an access decision on the basis of the status of peripheral components of adaptor 300, and may optionally make access decisions based upon the status of clock 205.

Variable data interface adaptor 300 may be replaced with a different type of adaptor, without affecting the data code stored in memory 202. Additionally, adaptor may be changed to allow added features that allow communication with preferred customers via interface 500. Interface 300 may be part of either a modem, a cellular transceiver, an alarm monitoring interface, a communication interface (such as an RS232, universal serial bus, infrared bidirectional receiver and transmitter, or radio frequency transceiver), or global positioning satellite receiver. Gap AG manufactures a line of transceivers that are marketed under the HiConnex and HiConnex Easy product line that may be incorporated into interface 300; additionally, the Siemens M20 and M20 terminals may also be used as the cellular engines of interface 300.

Entry unit and user interface 500 is always removable. In some embodiments, connection between adaptor 300 and interface 500 may not require a physical connection. For example, infrared bidirectional transmission, cellular transmission and radio frequency transmission and reception avoid the necessity of a cable extending between adaptor 300 and interface 500. In particular embodiments, interface 500 may be implemented with one or more of a card reader, keypad, biometric scanning reader, modem, personal computer host, cellular telephone, handheld computer, personal computer network (either a local area or wide area network), an internet interface, a data entry device or a memory device. Multiple types of data entry interface units 500 may be used with the same container 110, depending upon configuration of adaptor 300. Data entry unit 500 is not a permanent fixture of container 110 or controller 200. Entry unit 500 may deliver the status of container 110, as well as the location of the container to the user. Entry unit 500 may, in a particular embodiment, set the code data and criteria by which controller 200 acts on moving element 400. In the embodiment shown in FIG. 1, solenoid L1 may be used as movable element 400, to either engage, or release, hasp 169.

Figure 10:
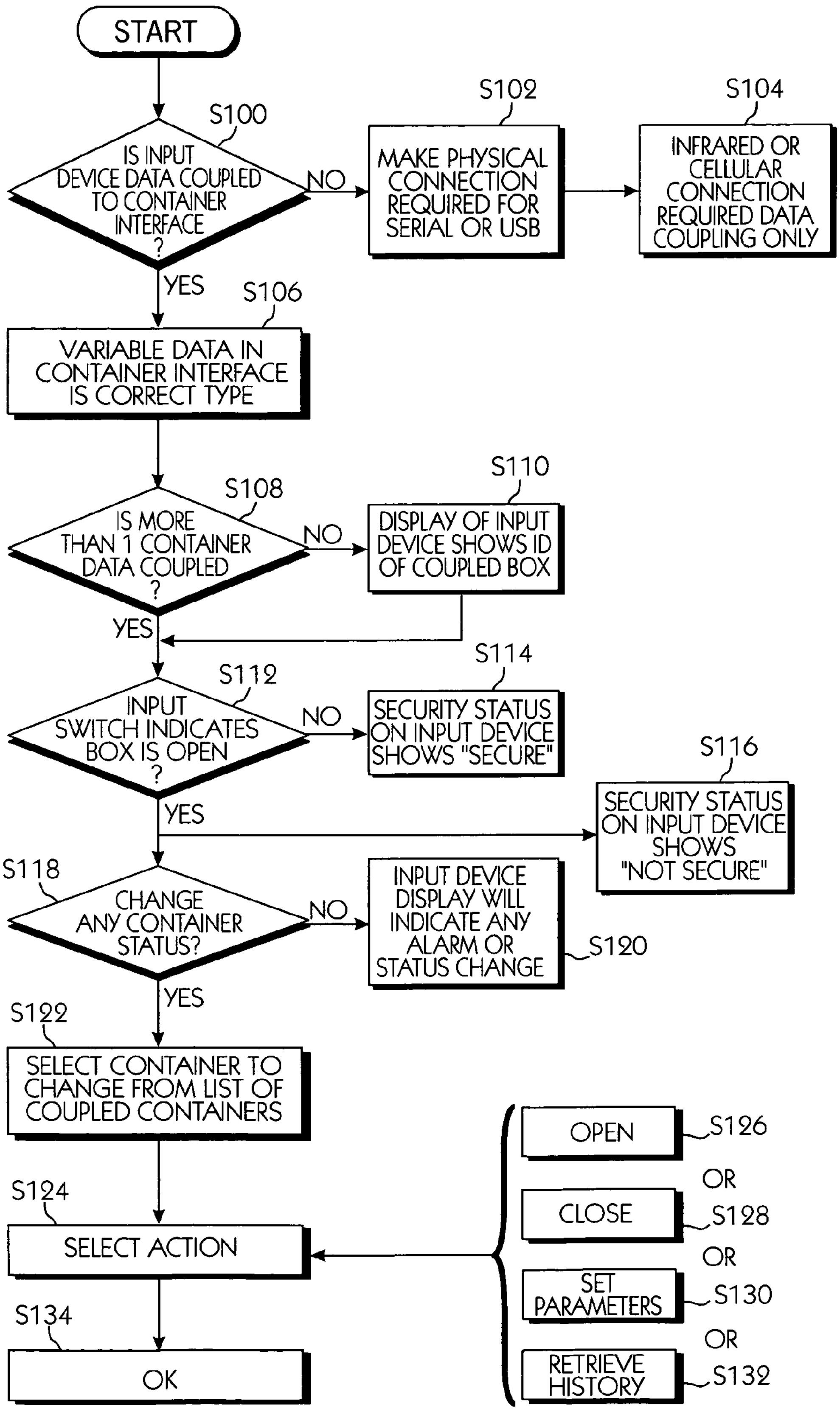
FIG. 10 is a flowchart that illustrates one mode of operation of an embodiment of the present invention.
Figure 11:
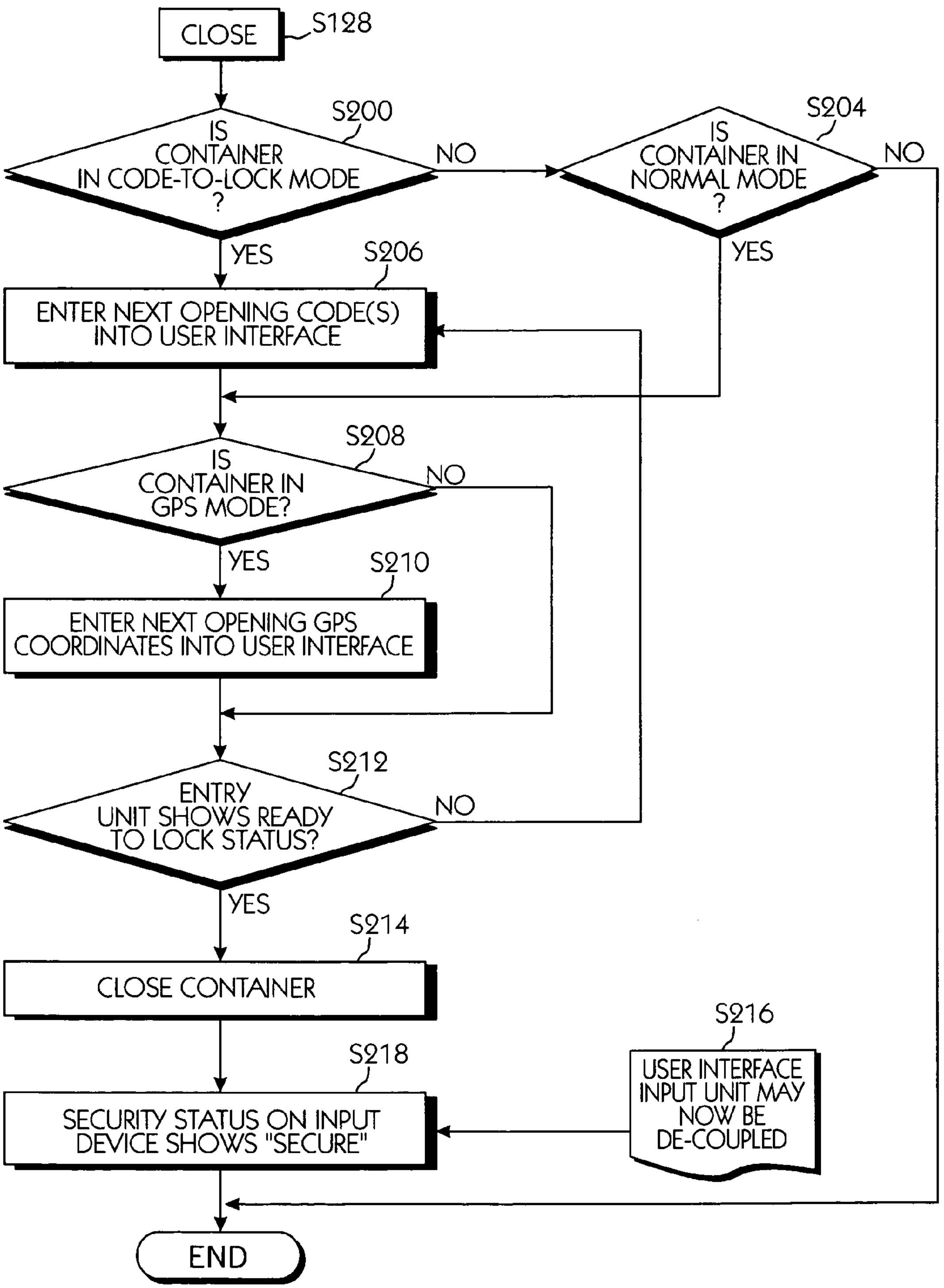
FIG. 11 is a flowchart that illustrates another mode of operation of an embodiment of the present invention of an embodiment of the present invention.
Figure 12:
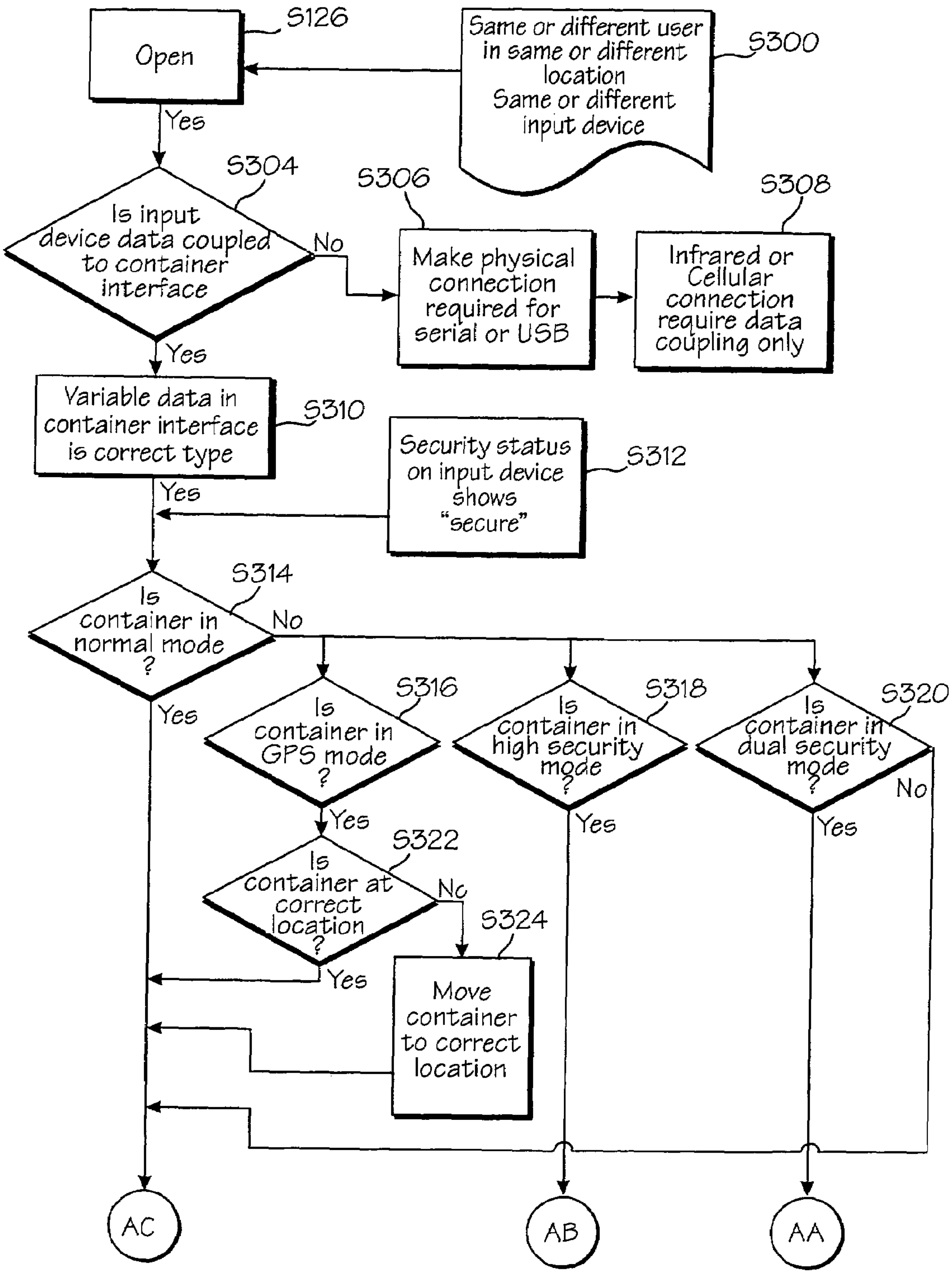
FIGS. 12 and 13 are flowcharts that illustrate the operation of an embodiment of the present invention while the container is in an open mode.
Figure 13:
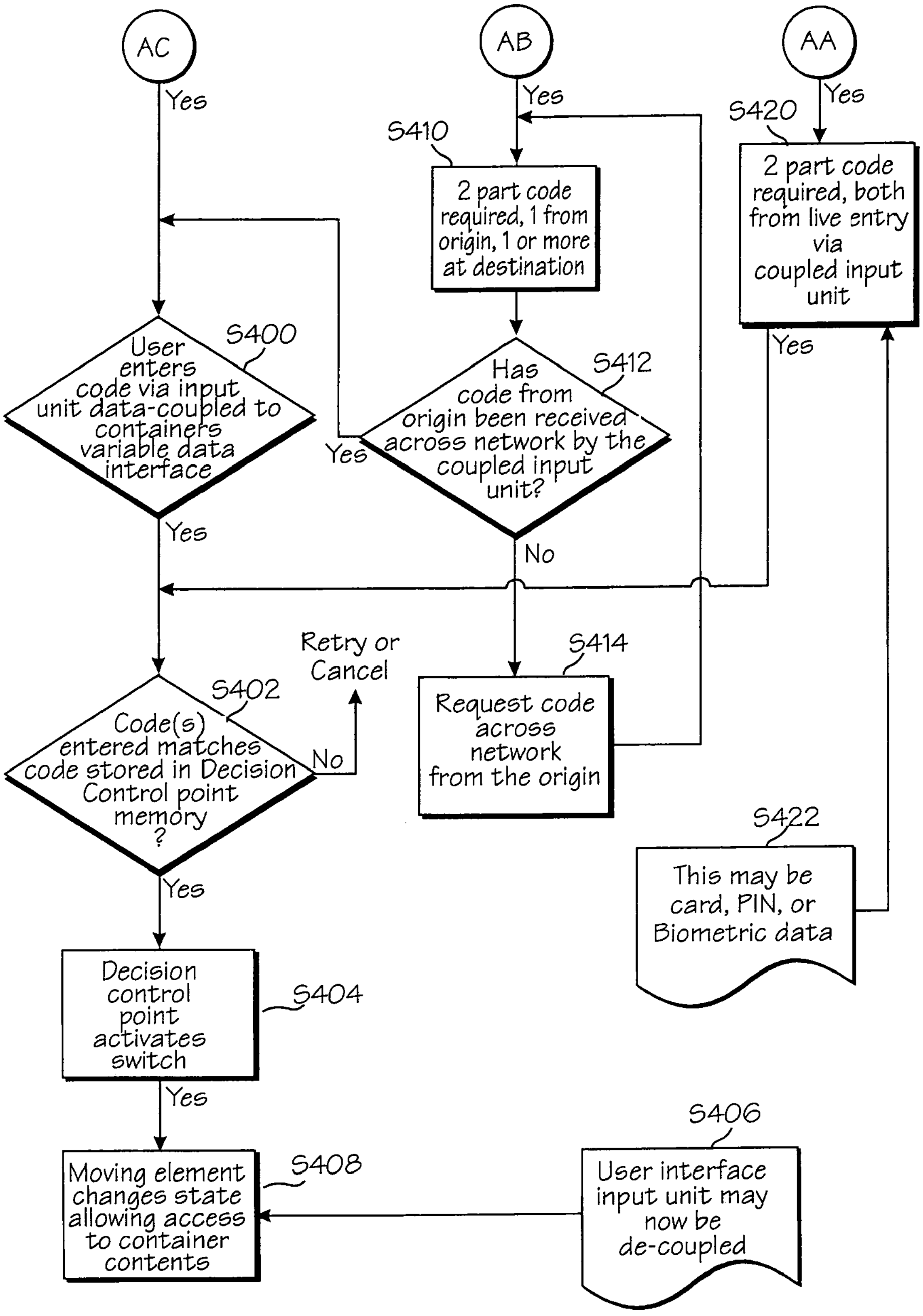
Figure 14:
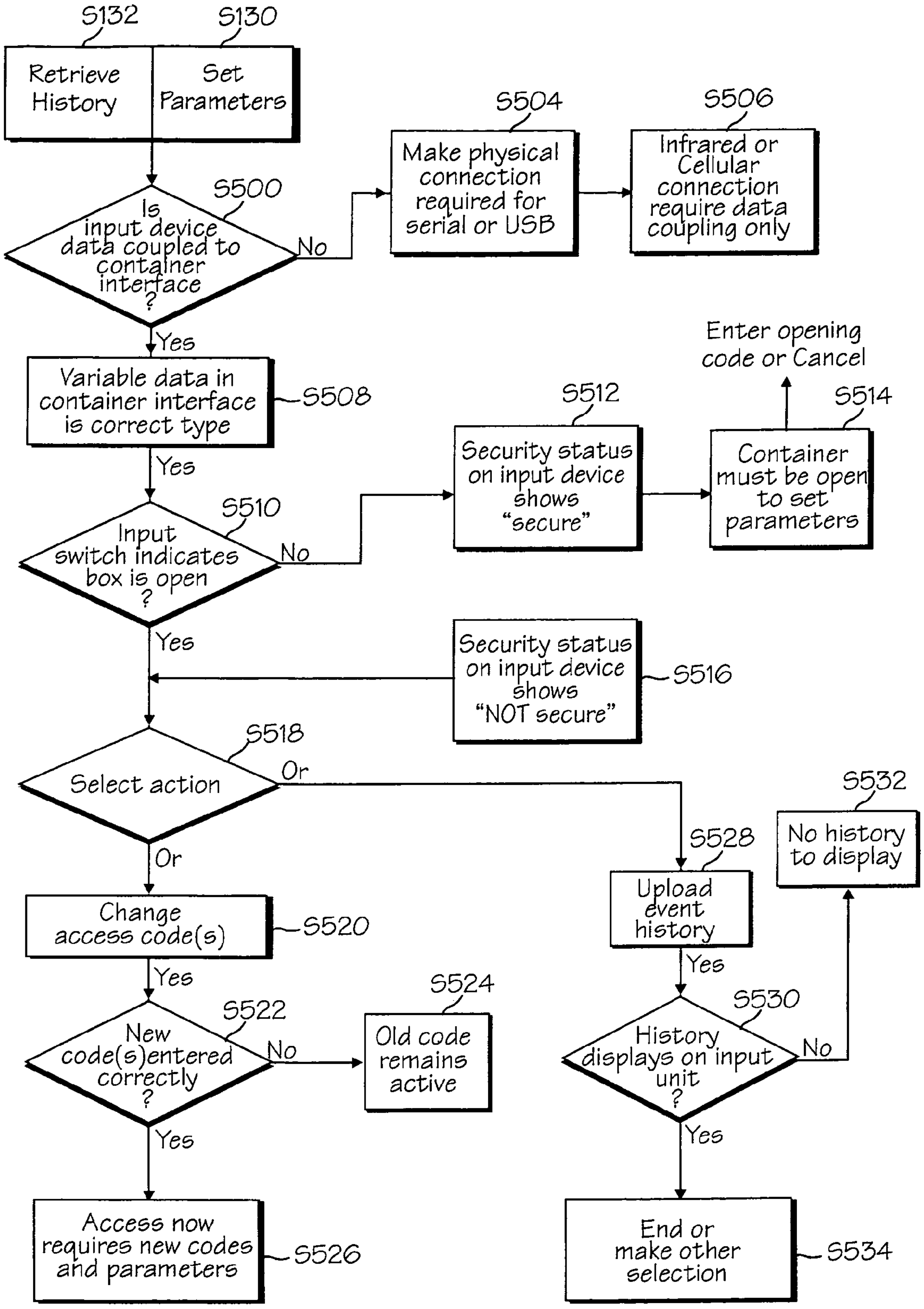
FIG. 14 is a flowchart that illustrates additional aspects of the operation of an embodiment of the present invention.

Turning now to the operation of the various embodiments and modifications of those embodiments disclosed in the foregoing paragraphs, FIG. 10 is a flowchart describing the beginning of a communication session between the display input device and data coupled container to the point of a major function selection; FIG. 11 is a flowchart describing the major function from FIG. 10 of closing the container to secure contents or prevent items being placed in the container; FIG. 12 is a flowchart that is the first of two charts describing the major function from FIG. 10 of opening a container to gain access to container contents or interior; FIG. 13 is a flowchart that is the second of two charts describing the major function from FIG. 10 of opening a container to gain access to container contents or interior; and FIG. 14 is a flowchart describing the major functions from FIG. 10 of retrieving event history and changing operational settings.

In the following description, the reader will find use of the terms, coupled and de-coupled as a description of data connection and disconnection, respectively, between a container or group of containers and one or more graphical user interface/input units of the same or varying types. This coupling may occur across the room, a length of wire, an air gap or across the globe in accordance with the network methods used to accomplish the data coupling. It may include live high speed data connection or may take the form of Internet mail or message packets, through which the container and the graphical user interface/input units exchange, data, settings, and exchange information.

Turning to FIG. 10, it may be seen that S100 determines if an input/graphical user interface device is currently data coupled to the containers variable data interface stage. S102 instructs connection for serial or USB connections while S104 instructs for infrared or cellular interfaces. If the interface type is correct as in S106, it must be determined in S108 whether more than one container is connected to the display/input device at one time. If only one device is connected as in S110 then the display will only indicate one coupled container along with its unique ID and its current security status. The indication of the unique ID displayed by the graphical user interface/input unit and the security status displayed are the result of communication between the micro-controller in the subject container and the micro-controller of the graphical user interface/input unit communicating via the Variable data interface section of the container circuitry and the communication interface of the graphical user interface/input unit. In the event that there are more than one container coupled as in Yes to S108 then the graphical user interface (i.e.,: cell phone, PC, PDA or other) will show each container and its current status. At S112, if the bolt position switch or series door position switch of a particular container indicates that the door is open then the status for that container is displayed as in S116 as Not Secure. If at S112, the status switch(es) indicate the container is secure as in S114, then that indication will appear on the currently coupled graphical user interface/input unit. S118 describes the users decision to change a container status If the user decision is no, then status on display will remain unchanged unless an event changes the status. In the event the user decides to change the status of a particular container he must select the container to change as in S122 and then as in S124 select a major function or action of either open container S126, close container S128, set parameters for the container S130 or retrieve history of the container as in S132. Once selection is made and confirmed S134 then the appropriate figure and flowchart may be followed.

Turning now to FIG. 11, we see the flowchart which represents the selection S128 close container. This action is for the purpose of securing contents stored in a container or preventing storage of items in a container by denying access to the contents. In the application where a container may be transportable and used in a courier application, it may be desirable to have the container locked when not used and in the courier companies inventory. This may help prevent inadvertent placement of contents in a box not currently slated for a particular customers use.

S200 determines if the container is in a code-to-lock mode. If it is as in S206, then a code must be used to lock the container. This action results in activation of the latching mechanism in such a way to allow the container to be made secure. One could allow any code, such as the current code, to be entered to secure the container or require a fresh unused code to be entered. In any case, the entered code S206 becomes the next code required for opening of the container. S208 determines if the container is in the GPS (global positioning system) mode. If the container is so equipped and in the GPS mode as in S210, then the global coordinates for one or more destinations where the container may be opened must be entered through the coupled graphical user interface. If the container is ready to secure as in S212, then it may be closed by the user S214. In the event the status shows that the container is not prepared to be secured S212 then the next code must be entered correctly starting the sequence again at S206. If S200 indicated that the container is in a mode other than code-to lock, Then it must be in normal mode S204 and the sequence begins at the entry of S208 to determine if GPS mode is active for the selected container. Once the container is secured as in S214, then the status indication of the coupled graphical user such as may be provided by a cellular telephone, interface/input unit will indicate secure. If user desired activity is complete for this container then the coupled graphical user interface/input unit may be de-coupled and if physical connection is part of the data coupling process, the physical connected may be removed as described at S216.

Observing now FIG. 12, starting at S126 the reader will see that the major function of choice for the user is to open the container. S300 indicates by the way of information that one or more users at the same or different locations and one or more types of coupled graphical user interface/input units may be involved in this process. Determination if of data coupling is described in S304, while S306 describes use of serial or USB connections, while S308 describes Infrared and RF or cellular connection. S310 determines that the variable data interface of the container is of a type compatible with the coupled graphical user interface/input unit. By way of information S312 indicates that the security status of the container shown on the coupled graphical user interface/input unit is secure. The indication of the unique ID displayed by the graphical user interface/input unit and the security status displayed are the result of communication between the micro-controller in the subject container and the micro-controller of the graphical user interface/input unit communicating via the Variable data interface section of the container circuitry and the communication interface of the graphical user interface/input unit. S314 determines if the container is in the normal mode. If the determination is yes then the user enters code as in S400. In the event that the container is in GPS mode S316 then it must be at the correct global coordinates to be opened S322. In the event it is not at the correct coordinates S324, the container must be re-located to the correct coordinates. (location). If the container is in high security mode S318, then 1 part of the required opening code must be received by the container from the origin site S412 before the user enters the second code data sequence at S400 at the destination site. In the event that the first part from the origin site S412 has not been received then the origin first code data must be requested across the network from the appropriate coupled origin source. In the event that the subject container is in the dual security mode as in S320, then two parts of a code must be entered into a coupled graphical user interface/input unit at S420. This two part code may consist of live entry of a password as well as a data carrying card credential or presentation of biometric data via a biometric reader to authenticate the user and thus complete code entry described by S422. If container is not in dual security mode at S320, then normal code entry at S400 permits the determination at S402. At S402 the micro controller reads its memory contents where the opening data is stored and compares that to the just entered codes described in the frames between S314 and S402. If code matches and authentication is deemed correct by the micro-controller, then the decision control point formed by the micro-controller, memory, clock and I/O will activate switch at S404 which in turn switches power to cause a moving element to change state at S408 thus allowing access to container interior and any contents therein. This moving element may for example be a latch, bolt or cover which is released by a motor, solenoid, bi-metal element, alloy element or other element capable of permitting access to the interior of the container. If user desired activity is complete for this container then the coupled graphical user interface/input unit may be de-coupled and if physical connection is part of the data coupling process, the physical connected may be removed as described at S406.

Observing now FIG. 12, starting at S1126 the reader will see that the major function of choice for the user is to retrieve history or set parameters. Determination if of data coupling is described in S500, while S504 describes use of serial or USB connections, while S506 describes Infrared and RF or cellular connection. S508 determines that the variable data interface of the container is of a type compatible with the coupled graphical user interface/input unit. By way of information S512 indicates that the security status of the container shown on the coupled graphical user interface/input unit is secure. The determination of this condition is the present state of input switches reflecting position of the latching mechanism and the container cover as read by the micro-controller as shown in S510. The indication of the unique ID displayed by the graphical user interface/input unit and the security status displayed are the result of communication between the micro-controller in the subject container and the micro-controller of the graphical user interface/input unit communicating via the Variable data interface section of the container circuitry and the communication interface of the graphical user interface/input unit. A not secure condition may be indicated as shown in S516. If the user chooses to upload the history events as in S528 then this history will be communicated to the graphical user interface/input unit for display. If no history exists S532, none will be displayed and the session may be ended or another selection made as in S532. Any of the choices S126,S128,S130,S132 or de-coupling as in S216 may be chosen. If the user chooses to change the code as in S520 and the new code is entered as in S522 then the access codes required to open the container are new ones as in S526. If incorrect parameters are met or incorrect code entry is made then the old code data remains active as in S524.

What is claimed is:

1. A container manager, comprising:

a housing comprised of a plurality of sidewalls bearing a removable lid, forming a container having a closed interior while said lid is in complete engagement with said housing, and providing an open interior able to removably receive items within said open interior while said lid is dislodged from said complete engagement;

a port disposed to conduct data signals through said housing;

a control stage comprised of a memory storing information specific to said container, said control stage being mounted entirely within and being completely encased by said container during said complete engagement, and being operationally coupled to provide communication with said interior via said port, and generating a control signal in dependence upon disposition of said port relative to a source of said data signals, in dependence upon disposition of said container within a scheme for generation of said data signals, and in response to occurrence of a coincidence between a data key received among said data signals via said port and a data sequence obtained by said control stage in dependence upon said information stored within said memory; and a moveable latch disposed to engage said lid and hinder removal of said lid from said complete engagement, and to respond to said control signal by releasing said lid from said complete engagement.

2. The container manager of claim 1, further comprised of a socket mounted within said housing providing said port.

3. The container manager of claim 1, further comprised of an infrared receiver mounted within said housing providing said port.

4. The container manager of claim 1, further comprised of an antenna mounted within said housing providing said port.

5. The container manager of claim 1, further comprised of:

a microprocessor based host computer operationally coupled to said controller via said port, generating said data key; and a data cable coupling said host computer to said port.

6. The container manager of claim 1, further comprised of:

a microprocessor based host computer operationally coupled to said controller via said port, generating said data key; and a local area network coupling said host computer to said port.

7. The container manager of claim 1, further comprised of:

a microprocessor based host computer operationally coupled to said controller via said port, generating said data key;

said port comprising a first antenna mounted on one of said sidewalls;

a data transceiver connecting said first antenna and said controller; and a second antenna driven by said host computer, operationally connecting said host computer to said first antenna.

8. The container manager of claim 1, further comprised of:

a microprocessor based host computer operationally coupled to said controller via said port, generating said data key;

an infrared transmitter driven by said host computer to broadcast an infrared signal corresponding to said data key; and an infrared receiver mounted in one of said sidewalls, disposed to receive said data key from said infrared transmitter.

9. The container manager of claim 1, further comprised of:

a microprocessor based host computer operationally coupled to said controller via said port, generating said data key;

a first infrared transmitter and receiver driven by said host computer to broadcast an infrared signal corresponding to said data key; and a second infrared transmitter and receiver mounted in one of said sidewalls, disposed to receive said data key from said infrared transmitter, and to transmit operational communications from said controller to said host computer via said first infrared transmitter and receiver.

10. The container manager of claim 1, further comprised of:

said controller generating an alarm signal in response to an unauthorized interruption of said communication via said port; and an alarm driven by said controller to broadcast an indication of said unauthorized interruption in response to said alarm signal.

11. The container manager of claim 1, further comprised of:

a microprocessor based host computer operationally coupled to said controller via said port, periodically making a determination of whether said an unauthorized interruption of said communication has occurred; and an alarm driven by said host computer to broadcast an indication of said unauthorized interruption in dependence upon said determination.

12. The container manager of claim 1, further comprised of:

said controller generating an alarm signal in response to an unauthorized interruption of said communication via said port;

a first alarm driven by said host computer to broadcast an indication of said unauthorized interruption in response to said alarm signal;

a microprocessor based host computer operationally coupled to said controller via said port, periodically making a determination of whether said unauthorized interruption of said communication has occurred; and a second alarm driven by said host computer to broadcast an indication of said unauthorized interruption in dependence upon said determination.

13. A container manager, comprising:

a housing comprised of a plurality of sidewalls bearing a removable lid, forming a container having a closed interior while said lid is in complete engagement with said housing, and providing an open interior able to removably receive items within said open interior while said lid is dislodged from said complete engagement;

a port disposed to conduct data signals through said housing;

a control stage comprised of a memory, said control stage being mounted on said container and being operationally coupled to provide communication with said interior via said port, and generating a control signal in response to occurrence of a coincidence between a data key received among said data signals via said port and a data sequence obtained by said control stage in dependence upon information stored within said memory, in dependence upon disposition of said port relative to a source of said data signals and in dependence upon disposition of said container within a timed scheme for generation of said data signals;

a microprocessor based host computer sited externally to said container, said host computer comprising a keyboard initiating formation of said data signals and a monitor driven by said host computer to visually display video images, said host computer being operationally coupled to said port and participating in said communication by generating said data signals; and an electromechanical latch disposed to engage said lid and hinder removal of said lid from said complete engagement, and to respond to said control signal by releasing said lid from said complete engagement.

14. The container manager of claim 13, further comprised of a data cable coupling said host computer to said port.

15. The container manager of claim 14, further comprised of a local area network coupling said host computer to said port.

16. The container manager of claim 15, further comprised of:

said port comprising a first antenna mounted on one of said sidewalls;

a data transceiver connecting said first antenna and said controller; and a second antenna driven by said host computer, operationally connecting said host computer to said first antenna.

17. The container manager of claim 16, further comprised of:

an infrared transmitter driven by said host computer to broadcast an infrared signal corresponding to said data key; and an infrared receiver mounted in one of said sidewalls, disposed to receive said data key from said infrared transmitter.

18. The container manager of claim 17, further comprised of:

a first infrared transmitter and receiver driven by said host computer to broadcast an infrared signal corresponding to said data key; and a second infrared transmitter and receiver mounted in one of said sidewalls, disposed to receive said data key from said infrared transmitter, and to transmit operational communications from said controller to said host computer via said first infrared transmitter and receiver.

19. A container manager, comprising:

a housing comprised of a plurality of sidewalls bearing a removable lid, forming a container having a closed interior while said lid is in complete engagement with said housing, and providing an open interior able to removably receive items within said open interior while said lid is dislodged from said complete engagement;

a source of an input signal representing a first class of information, mounted upon and borne by said housing;

a port disposed to accommodate transmission of data signals through said housing;

a control stage comprised of a memory storing a second class of information specific to said container, said control stage being mounted entirely within and being completely encased by said container during said complete engagement, and being operationally coupled to provide communication with said interior via said port, and generating a control signal in dependence upon disposition of said port relative to an origin of said data signals, in dependence upon said information represented by said input signal, and in response to occurrence of a coincidence between a data key received among said data signals via said port and a data sequence obtained by said control stage in dependence upon said information stored within said memory; and a latch mounted on said housing and disposed to engage said lid and hinder removal of said lid from said complete engagement, and to respond to said control signal by releasing said lid from said complete engagement.

20. The container manager of claim 19, further comprised of said source detecting movement of said lid, and said first class of information indicating said movement.

21. The container manager of claim 19, further comprised of said source detecting a position of said lid, and said first class of information indicating said position.

22. The container manager of claim 19, further comprised of said control stage generating said control signal in response to instructions received by said control stage from said host computer independently of said disposition of said port, independently of said information represented by said input signal, and independently of said occurrence of coincidence.

23. The container manager of claim 19, further comprised of said control stage generating said control signal in dependence of said disposition of said port, in dependence of said information represented by said input signal, in dependence of said occurrence of coincidence, and in response to instructions received by said control stage from a host computer coupled to said port.

24. The container manager of claim 19, further comprised of said container being transportable between an origin and a destination, and said data key being encoded and being available only at destination.

25. The container manager of claim 19, further comprised of said container being transportable between an origin and a destination, and said data key being encoded and being transmitted to said port from said origin.

26. The container manager of claim 19, further comprised of said container being transportable between an origin and a destination, and said data key being encoded and being available only at destination.

27. The container manager of claim 19, further comprised of a microprocessor based host computer operationally coupled to said controller via said port, generating said data signals.

28. The container manager of claim 27, further comprised of said host computer comprising a cellular telephone bearing a graphical user interface.

29. The container manager of claim 19, further comprised of some or all of said data signals being transmitted across or received one of an Internet and a wide area network.

30. The container manager of claim 19, further comprised of said data signals comprising one of an e-mail packet and an attachment to an e-mail message.

31. The container manager of claim 19, further comprised of said information represented by said source comprising a global location of the container, and said control stage generating said control signal in dependence of said disposition of said port, in dependence of said information represented by said input signal, and in dependence of said occurrence of coincidence.

32. The container manager of claim 19, further comprised of said container being transportable between an origin and a destination, and a user at one of said origin and said destination requests via a network a request for some part of said data key.

33. The container manager of claim 19, further comprised of said container being transportable between an origin and a destination, and said second class of information is installed at said origin comprises biometric data matching a person of a human user of said container and said coincidence must be made with biometric data matching said person at said destination.

* * * * *